(12) United States Patent
Tso et al.

(10) Patent No.: US 8,379,133 B2
(45) Date of Patent: Feb. 19, 2013

(54) PHOTOGRAPHIC DEVICE AND HOLDER THEREOF

(75) Inventors: Chia-Ching Tso, Hsinchu (TW); Yu-Jen Huang, Hsinchu (TW); Chih-Hao Lin, Hsinchu (TW)

(73) Assignee: Altek Corporation, Hsinchu (TW)

( * ) Notice: Subject to any disclaimer, the term of this patent is extended or adjusted under 35 U.S.C. 154(b) by 244 days.

(21) Appl. No.: 12/963,846

(22) Filed: Dec. 9, 2010

(65) Prior Publication Data

US 2011/0075024 A1 Mar. 31, 2011

(30) Foreign Application Priority Data

May 14, 2009 (TW) .............................. 99115499 A

(51) Int. Cl.
*H04N 5/225* (2006.01)
(52) U.S. Cl. .................... 348/340; 348/374; 348/375
(58) Field of Classification Search .......... 348/373–376, 348/340
See application file for complete search history.

(56) References Cited

U.S. PATENT DOCUMENTS

| | | | |
|---|---|---|---|
| 5,624,499 A * | 4/1997 | Mizuno et al. ................ | 118/725 |
| 7,449,091 B2 | 11/2008 | Du et al. | |
| 2006/0091487 A1 * | 5/2006 | Hanada et al. ................ | 257/432 |
| 2009/0052887 A1 * | 2/2009 | Cheng et al. .................. | 396/529 |
| 2009/0122426 A1 * | 5/2009 | Cheng ........................... | 359/819 |
| 2009/0128681 A1 * | 5/2009 | Kim .............................. | 348/335 |
| 2010/0002317 A1 * | 1/2010 | Osaka et al. .................. | 359/824 |

FOREIGN PATENT DOCUMENTS

TW 388554 4/2000

* cited by examiner

*Primary Examiner* — Tuan Ho
*Assistant Examiner* — Shahbaz Nazrul
(74) *Attorney, Agent, or Firm* — Alan Kamrath; Kamrath IP Lawfirm, P.A.

(57) ABSTRACT

A holder is disclosed, wherein the holder is situated on a circuit board and is used for connecting with an electronic component. The holder comprises an upper surface, a lower surface, and an opening. The upper surface comprises a recess used for laying a flat component, wherein the recess comprises at least one rough area; the lower surface comprises a protruding edge, wherein the protruding edge is connected with the circuit board with glue, and the protruding side and the circuit board delimit a space; and the opening penetrates the upper surface and the lower surface, whereby the gas generated from heating the glue will accumulate in the enclosed space, and the gas will then escape through the opening and out through at least one of the rough areas.

10 Claims, 4 Drawing Sheets

PHOTOGRAPHIC DEVICE AND HOLDER THEREOF

BACKGROUND OF THE INVENTION

1. Field of the Invention

The present invention relates to a type of a holder and a photographic device, especially to a type of the holder and the photographic device which has gas escape and glue reinforcement designs.

2. Description of the Related Art

In the manufacturing process of the Chip On Board (COB), a holder is often situated on the PCB, and an electronic component can be situated on the holder. Black glue is usually used as an adhesive for the PCB and the holder, but this has the following disadvantages:

1. When the black glue is heated, gas is generated and accumulates in the holder. This will result in unevenness in the holder and will cause the holder to tilt on the PCB. This may also cause the holder to be easily detached from the PCB;

2. Even if the holder is not detached from the PCB, the holder being tilted on the PCB will affect the accuracy of the Modulation Transfer Function (MTF), further influencing the product yield rate; and 3. The surface area in contact between the holder and the PCB is minimal, resulting in insufficient adhesion of the black glue. When the holder and PCB are knocked or shaken, the holder is easily detached from the PCB.

To overcome the disadvantages of the accumulated gas in the related arts, gas escape holes were designed in the holders (as disclosed by Taiwan Patent No. 388554 or No. I240300). With these designs, gas can escape from inside the holder. However, this type of design also allows dust particles to settle inside the holder. This will increase the difficulty of the module formation for the holder design, thus affecting the production line yield rate. The expenses of the holder module design and product cost will also increase.

Therefore, it is necessary to provide a type of holder and photographic device which will eliminate problems encountered by prior technologies.

SUMMARY OF THE INVENTION

The main objective of the present invention is to provide a holder and a photographic device. To achieve the above objectives, the holder is placed on the PCB and the holder is used for connecting with the electronic component. The holder comprises an upper surface, a lower surface and an opening. The upper surface comprises a recess used for laying a flat component, and the recess comprises at least one rough area; the lower surface comprises a protruding edge that is joined to the circuit board with glue, and the protruding side and the circuit board delimit a space; the opening penetrates through the upper surface and the lower surface. From this, the gas generated from heating the glue will accumulate in the enclosed space, and the gas will then escape through the opening and out of at least one of the rough areas.

In an embodiment of the present invention, the protruding edge comprises at least one trench for loading the glue; as a result, at least one trench will increase the surface area contact between the protruding edge and the circuit board To achieve the above objectives, the photographic device of the present invention comprises an electric circuit board, a holder, and an electronic component. The holder is situated on the circuit board, and the electronic component is situated on the holder. The holder comprises an upper surface, a lower surface, and an opening, wherein the upper surface comprises a recess used for laying a flat component, and the recess comprises at least one rough area; the lower surface comprises a protruding edge that is joined to the circuit board with glue, and the protruding side and the circuit board delimit a space; and the opening penetrates through the upper surface and the lower surface.

In an embodiment of the present invention, the protruding edge comprises at least one trench for loading the glue; thereby, at least one concave trench will increase the surface area contact between the protruding edge and the circuit board.

DETAILED DESCRIPTION OF THE PREFERRED EMBODIMENT

The advantages and innovative features of the invention will become more apparent from the following preferred embodiments.

Figure 1:
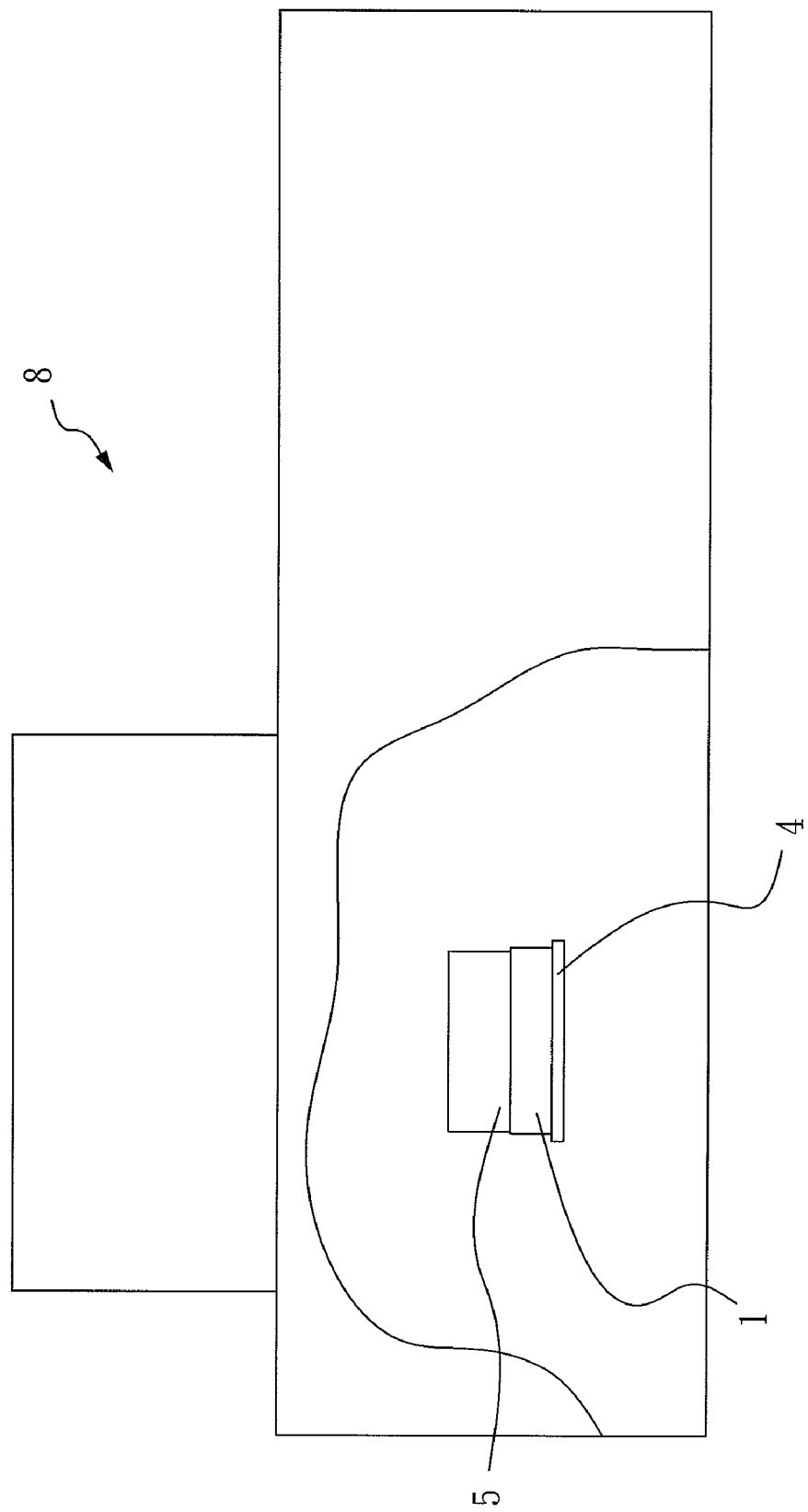
FIG. 1 is a diagram illustrating the photographic device of the present invention.

Please refer to FIG. 1 to FIG. 4, which are related to the holder and the photographic device of the present invention. FIG. 1 is a diagram illustrating the photographic device of the present invention.

As shown in FIG.1, the photographic device 8 of the present invention comprises: a circuit board 4; a holder 1, and an electronic component 5, wherein the holder 1 is situated on the circuit board 4, and the electronic component 5 is situated on the holder 1.

In an embodiment of the present invention, the photographic device 8 is a digital camera, but the present invention is not limited to this. For example, the photographic device 8 can be a digital video recorder, a mobile phone camera, a PDA that has photo-shooting functions, or any other electronic device that has photo shooting functions. In an embodiment of the present invention, the electronic component 5 is a voice coil motor (VCM), but the present invention is not limited to this.

Figure 2:
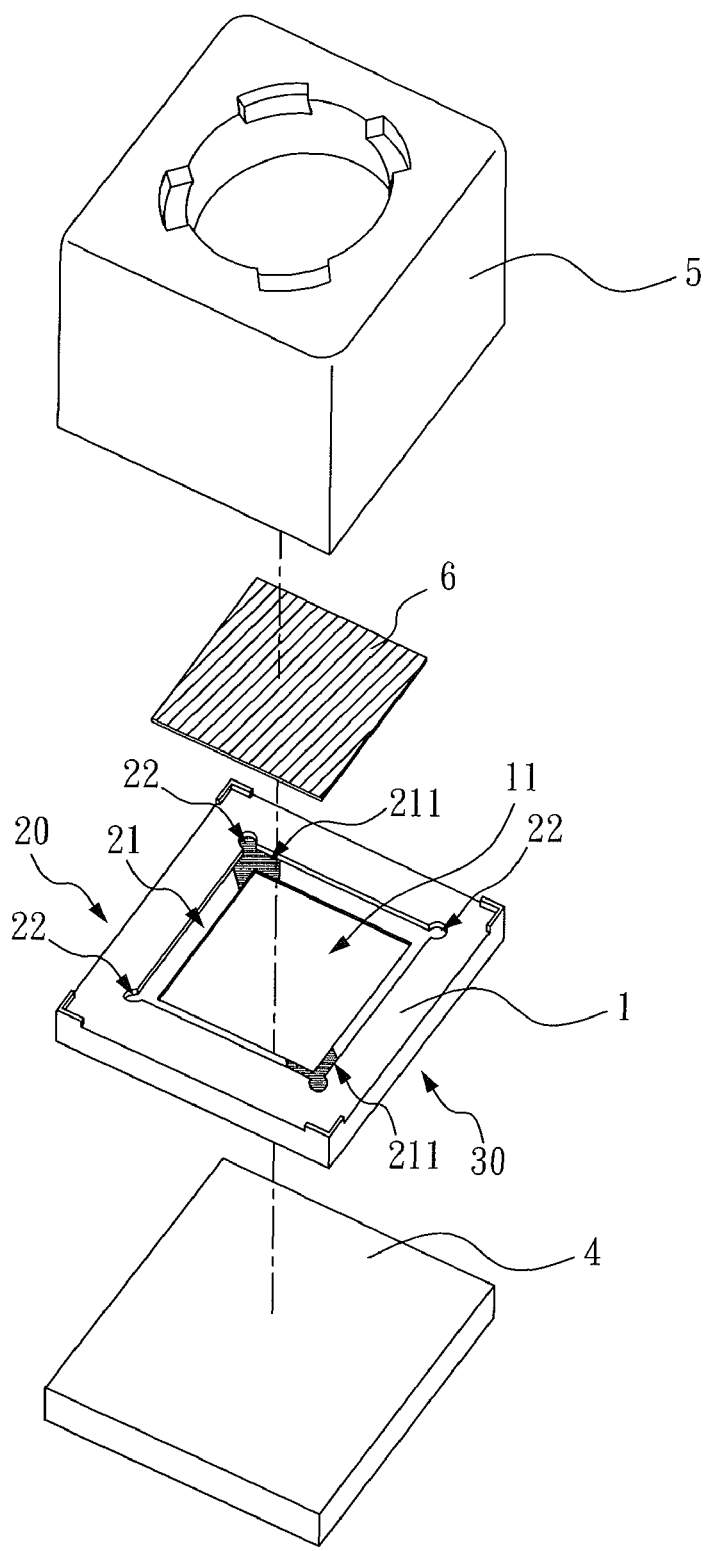
FIG. 2 is an exploded perspective diagram illustrating the photographic device of the present invention.

FIG. 2 is an exploded perspective diagram illustrating the photographic device of the present invention.

As shown in FIG. 2, the holder 1 comprises: an upper surface 20, a lower surface 30, and an opening 11, wherein the upper surface 20 is used for connecting with the electronic component 5, and the lower surface 30 is joined with the circuit board 4.

In an embodiment of the present invention, the upper surface 20 comprises a recess 21, wherein the recess 21 is concave for laying the flat component 6; and the recess 21 comprises at least one rough area 211" and at least one gap area 22. The at least one gap area 22 is connected to the at least one rough area 211; the opening 11 penetrates through the upper surface 20 and the lower surface 30. In an embodiment of the present invention, the flat component 6 is a glass plate, but the present invention is not limited to this.

In an embodiment of the present invention, the formation of the rough area 211 can be achieved through the roughening treatment (or haze treatment) at the recess 21, but the present invention is not limited to this. Take note that because the technology of the roughening treatment (or haze treatment) is widely known, no elaborations on the treatment process will be made.

As shown in FIG. 2 in the embodiment of the present invention, there are two rough areas 211 situated on opposite sides, but the present invention is not limited to this.

Figure 3:
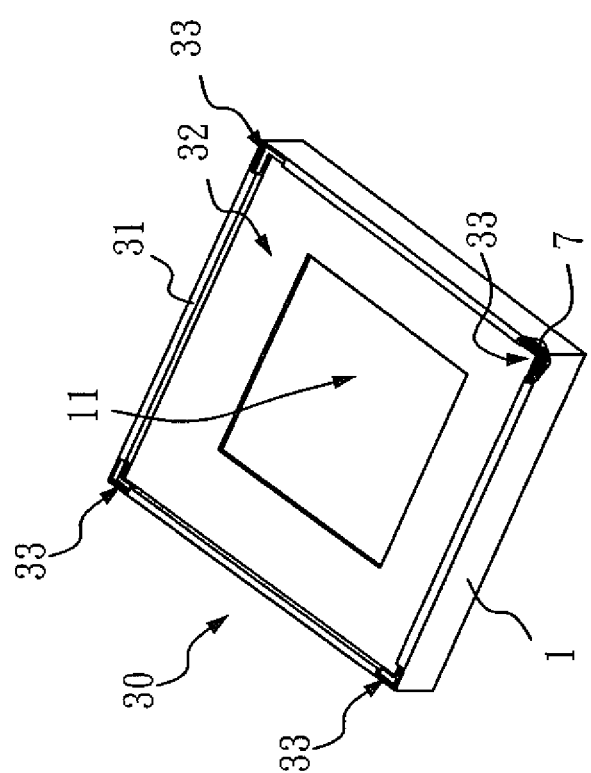
FIG. 3 is a backside diagram illustrating the holder of the present invention.

FIG. 3 is a backside diagram illustrating the holder of the present invention. As shown in FIG. 3, the lower surface 30 of the holder 1 comprises the protruding edge 31, and a space 32 is enclosed between the protruding edge 31 and the circuit board 4 (as shown in FIG. 2). The protruding edge 31 comprises at least one trench 33, wherein the glue 7 is applied on the protruding edge 31 and on at least one trench 33.

In an embodiment of the present invention, there are four trenches situated facing each other in pairs, but the present invention is not limited to this. In the embodiment of the present invention, the glue 7 is black glue, but the present invention is not limited to this.

Figure 4:
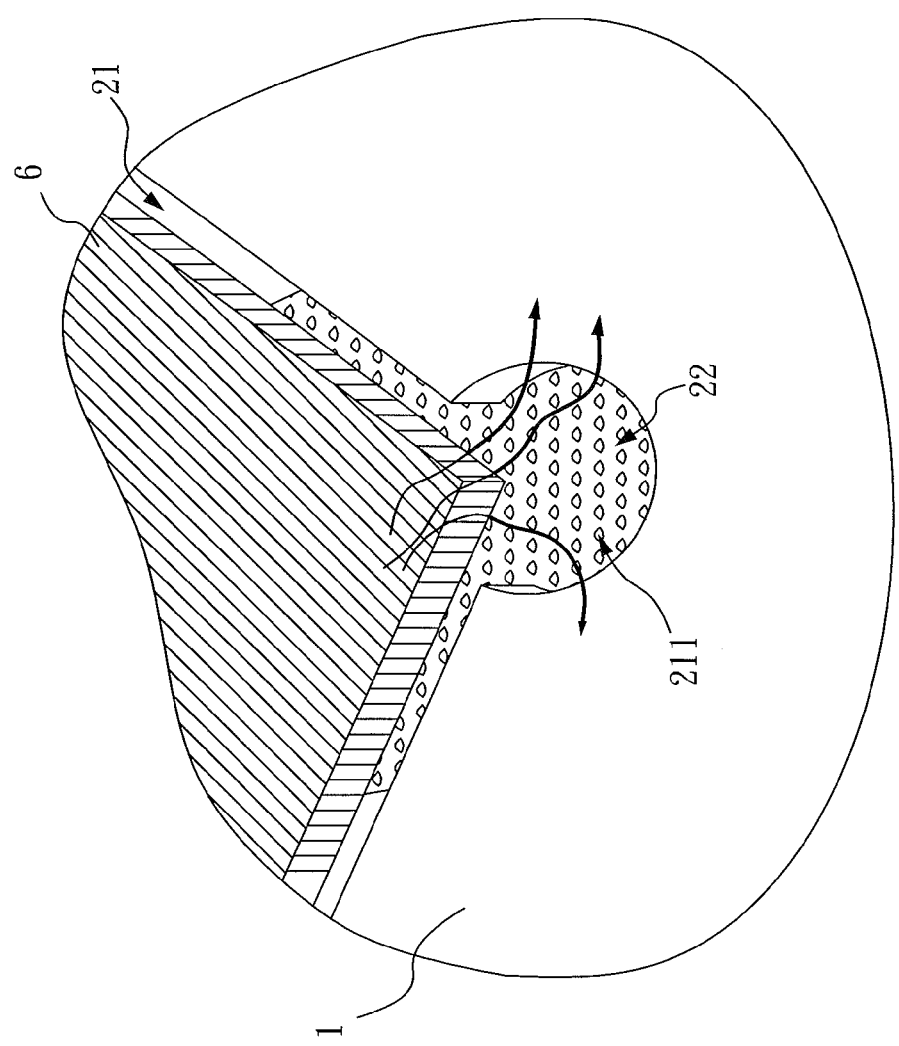
FIG. 4 is a gas escape diagram of the present invention.

When the glue 7 is evenly applied onto the protruding edge 31 and onto the at least one trench 33, the holder 1 is then placed into a suitable position on the circuit board 4. Next, the glue 7 is heated until it solidifies. The gas generated from heating the glue 7 will accumulate in the space 32 (as shown in FIG. 3). As shown in FIG. 4, the flat component 6 is placed on the recess 21. Because of the uneven surface of the at least one rough area 211, the gas will escape out of the holder 1 through the at least one rough area 211 that is connected with the at least one gap area 22.

The holder and photographic device of the present invention consists of the following advantages:

1. It eliminates the problem encountered from prior arts regarding the gas accumulated in the holder, which causes the holder to be uneven or to tilt;

2. it resolves the problem encountered from prior arts regarding the gas escape holes which allowed dust particles to settle inside the holder;

3. the formation of the rough areas can be achieved through the roughening treatment (or haze treatment) at the recess of the holder, and this will not affect the original mould design of the holder; therefore, the cost of the holder mould design remains the same;

4. the adhesive surface area increases between the holder and the circuit board, thus increasing the adhesive force of the glue. This prevents the holder from detaching from the circuit board when knocked or shaken.

Although the present invention has been explained in relation to its preferred embodiment, it is also of vital importance to acknowledge that many other possible modifications and variations can be made without departing from the spirit and scope of the invention as hereinafter claimed

What is claimed is:

1. A holder situated on a circuit board, wherein the holder used for connecting with an electronic component comprises:
　an upper surface, which comprises a recess used for laying a flat component,
　wherein the recess comprises at least one rough area;
　a lower surface, which comprises a protruding edge; the protruding edge is joined to the circuit board with glue, and the protruding side and the circuit board delimit a space; and
　an opening, which penetrates through the upper surface and the lower surface;
　through this opening, gas generated from heating the glue will accumulate in the space; the gas will then escape through the opening and out through at least one of the rough areas.

2. The holder as claimed in claim 1, wherein the lower surface comprises at least one gap area, which is connected with the at least one rough area;
　as a result, the gas generated from heating the glue will accumulate in the space; the gas will then escape through the opening and out through at least one of the rough areas and at least one of the gap areas.

3. The holder as claimed in claim 1, wherein the number of rough areas is two, and the rough areas are situated on opposite sides.

4. The holder as claimed in claim 1, wherein the protruding edge comprises at least one trench for loading the glue; thereby, the at least one trench will increase the surface area between the protruding edge and the circuit board.

5. The holder as claimed in claim 4, wherein the number of trenches is four, and the trenches are situated on opposite sides.

6. The holder as claimed in claim 1, wherein the electronic component is a voice coil motor (VCM).

7. A photographic device comprising:
　a circuit board;
　a holder situated on the circuit board, wherein the holder comprises:
　an upper surface, which comprises a recess used for laying a flat component, wherein the recess comprises at least one rough area;
　a lower surface, which comprises a protruding edge that is connected to the circuit board with glue, and the protruding side and the circuit board delimit a space;
　an opening, which penetrates through the upper surface and the lower surface;
　and an electronic component, which is situated on the holder;
　from this, the gas generated from heating the glue will accumulate in the space; the gas will then escape through the opening and out of at least one of the rough areas.

8. The photographic device as claimed in claim 7, wherein the recess comprises at least one gap area, which is connected with the at least one rough area.

9. The photographic device as claimed in claim 7, wherein the number of rough areas is two, and the rough areas are situated on opposite sides.

10. The photographic device as claimed in claim 7, wherein the protruding edge comprises at least one trench for loading the glue, and at least one trench will increase the surface area contact between the protruding edge and the circuit board.

* * * * *